(12) United States Patent
Cordier et al.

(10) Patent No.: US 9,949,108 B2
(45) Date of Patent: Apr. 17, 2018

(54) METHOD FOR DETECTING AN ADJACENT ACTIVE NEAR-FIELD COMMUNICATION DEVICE

(71) Applicant: STMicroelectronics International N.V., Schiphol (NL)

(72) Inventors: Nicolas Cordier, Luynes (FR); Vinko Kunc, Ljubljana (SI); Maksimiljan Stiglic, Maribor (SI)

(73) Assignee: STMICROELECTRONICS INTERNATIONAL N.V., Schiphol (NL)

( * ) Notice: Subject to any disclaimer, the term of this patent is extended or adjusted under 35 U.S.C. 154(b) by 0 days.

(21) Appl. No.: 15/472,907

(22) Filed: Mar. 29, 2017

(65) Prior Publication Data

US 2018/0020338 A1 Jan. 18, 2018

Related U.S. Application Data

(60) Provisional application No. 62/361,620, filed on Jul. 13, 2016.

(51) Int. Cl.
| | | |
|---|---|---|
| *H04W 8/00* | (2009.01) | |
| *H04W 40/24* | (2009.01) | |
| *H04W 76/02* | (2009.01) | |
| *H04B 5/00* | (2006.01) | |
| *H04W 48/10* | (2009.01) | |
| *H04W 4/00* | (2018.01) | |

(52) U.S. Cl.
CPC .......... *H04W 8/005* (2013.01); *H04B 5/0025* (2013.01); *H04W 4/008* (2013.01); *H04W 48/10* (2013.01)

(58) Field of Classification Search
CPC ..... H04W 8/005; H04W 48/10; H04W 4/008; H04W 40/246; H04W 76/02; H04B 5/0025
See application file for complete search history.

(56) References Cited

U.S. PATENT DOCUMENTS

| | | | | |
|---|---|---|---|---|
| 2006/0094356 | A1* | 5/2006 | Dawidowsky | G06K 7/0008 455/41.1 |
| 2007/0242729 | A1* | 10/2007 | Quinn | H04L 63/061 375/130 |
| 2008/0247377 | A1* | 10/2008 | Van Horn | H04W 52/0225 370/348 |
| 2011/0153818 | A1* | 6/2011 | Vandwalle | H04L 67/16 709/224 |
| 2014/0159653 | A1* | 6/2014 | Von Novak | H04B 5/0031 320/108 |

(Continued)

*Primary Examiner* — Andrew Wendell
(74) *Attorney, Agent, or Firm* — Slater Matsil, LLP

(57) ABSTRACT

According to an embodiment, a method can be performed by a first active near-field communication (NFC) device. The method includes assuming a field detection mode, generating an advertisement pulse, and checking whether a predefined condition is fulfilled. If the checking determines that the predefined condition is fulfilled, the method includes assuming an active mode and communicating with an adjacent active NFC device, and, if the checking does not determine that the predefined condition is fulfilled, the method includes staying in the field detection mode and generating another advertisement pulse.

20 Claims, 7 Drawing Sheets

(56) References Cited

U.S. PATENT DOCUMENTS

| | | | | |
|---|---|---|---|---|
| 2014/0293851 A1* | 10/2014 | Abraham | .......... | H04W 52/0225 370/311 |
| 2014/0370837 A1* | 12/2014 | Gladstone | ............. | H04W 4/008 455/404.1 |
| 2016/0174221 A1* | 6/2016 | Patil | ...................... | H04L 5/0055 370/329 |
| 2016/0234371 A1* | 8/2016 | Kang | ................ | H04M 1/72533 |

* cited by examiner

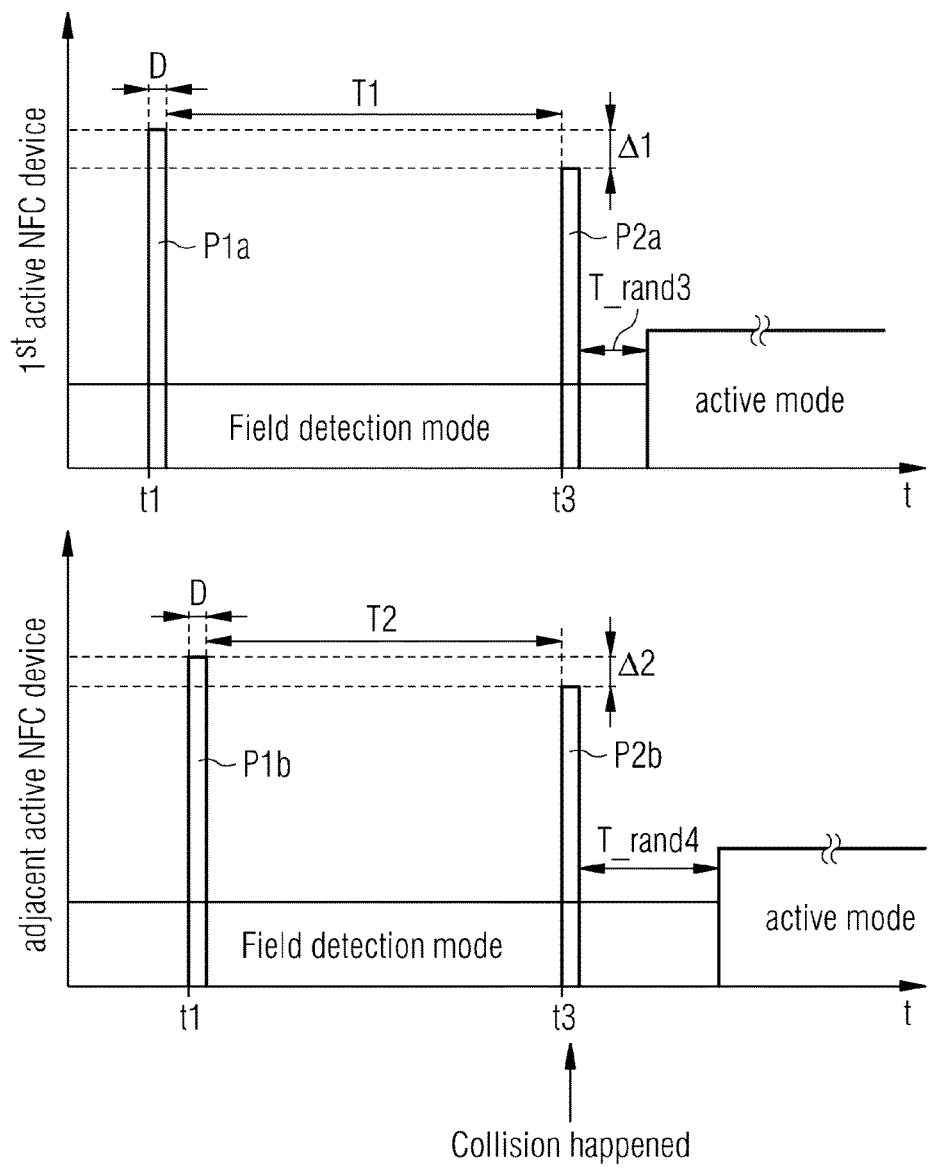

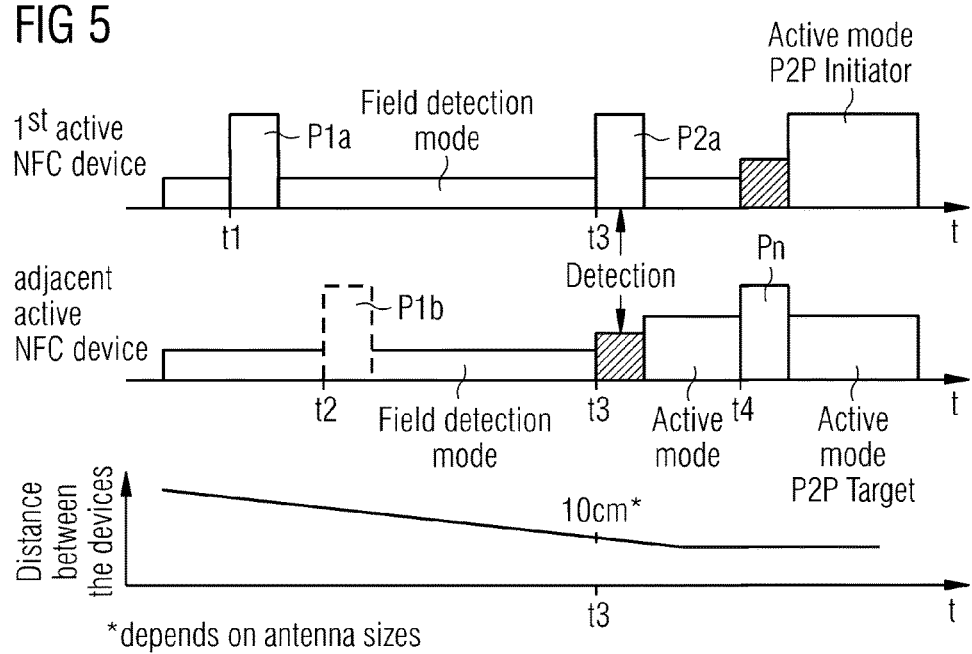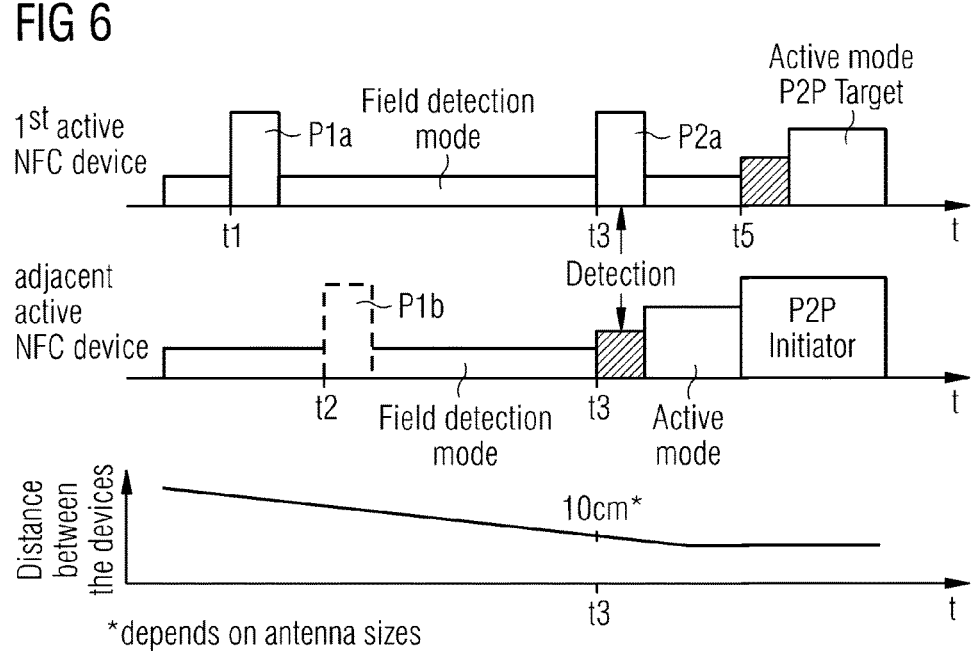

METHOD FOR DETECTING AN ADJACENT ACTIVE NEAR-FIELD COMMUNICATION DEVICE

CROSS-REFERENCE TO RELATED APPLICATIONS

This application claims the benefit of U.S. Provisional Application No. 62/361,620, filed on Jul. 13, 2016, which application is hereby incorporated herein by reference.

TECHNICAL FIELD

The application concerns a method for detecting an adjacent active near-field communication (NFC) device and a circuit arrangement for an active NFC device.

BACKGROUND

The present application pertains to the field of NFC technology. NFC is a short-range, standards-based wireless connectivity technology which is based on radio frequency identification, RFID, technology that uses magnetic field induction to enable communication between electronic devices in close proximity. NFC operates in the standard unlicensed 13.56 MHz frequency band over a distance of up to approximately 20 cm. Two modes of operation are defined by NFC protocols: active and passive. In active mode a device, which can either take up the role of a reader-writer or of an NFC tag, generates its own field to transmit data. The generation of its own field is also called active load modulation (ALM). Devices employing ALM are called active devices. On the other hand, in passive mode a device uses load modulation to transfer data in accordance with what is well-known to a person skilled in the art.

When implementing NFC technology in, for example, smartphones and smart watches, ALM has replaced the passive load modulation, because it allows the antenna size to be significantly reduced.

In order for two NFC devices to communicate, the devices have to detect or discover each other. Device detection is a process that runs on an NFC device with the purpose of enabling communication with a communication partner, i.e., another NFC device.

Existing mechanisms for device detection are low power card detection on the one side, and on the other side low power field detection. Thereby low power card detection allows an active NFC device, for instance a phone, to detect a passive tag. Low power field detection enables card emulation devices, for example phones or smart watches, to detect a magnetic field generated by an NFC reader device. The low power card detection relies on the loading effect between two devices which is based on magnetic induction. A first active device therefore periodically sends out pulses and monitors one or several electrical parameters, for example amplitude and/or phase, of these pulses. A second NFC device, which is not necessarily an active device, loads the first device when located in close proximity. The loading effect has an impact on the electrical characteristics of the pulses sent out by the first device. By noticing changes in the monitored electrical parameters the first device detects the presence of the second device. Once the second device is detected, the first device can initiate an NFC forum compliant reader/writer operation or a peer-to-peer transaction as defined in the NFC forum standards.

In the case that the second device is an active device which uses ALM, the second device may have a very small antenna which reduces the loading effect on the first device and consequently considerably diminishes the detection distance. The reduced detection distance renders the existing low power card detection scheme unsuitable for scenarios with two active devices.

SUMMARY

Embodiments of the present application define a method for reliably detecting an active NFC device.

The definitions as described above also apply to the following description unless stated otherwise.

In one embodiment, a method for detecting an adjacent active NFC device comprises assuming a field detection mode, generating an advertisement pulse, and checking whether a predefined condition is fulfilled. If the checking proves positive, an active mode is assumed and communication can be made with the adjacent active NFC device. If the checking proves negative, the device stays in the field detection mode and another advertisement pulse generated. The method is executed by a first active NFC device.

According to the proposed method, the first active NFC device detects the adjacent active NFC device in the field detection mode which is a low power mode in which the first active device is just scanning for any incoming pulses emitted by other active devices in its neighborhood and from time-to-time generates an advertisement pulse to advertise its presence to other devices in close proximity. The first device checks whether a predefined condition is fulfilled. As long as the condition is not fulfilled, the first active device stays in the field detection mode and continues generating another advertisement pulse and checking again for fulfillment of the predefined condition in a loop fashion. As soon as the checking reveals that the predefined condition is fulfilled, the first active device assumes an active mode and starts communicating with the detected adjacent NFC device.

Advantageously the proposed method enables reliable detection of an adjacent active NFC device by a first active NFC device while both devices are a low power mode called the field detection mode.

Generating an advertisement pulse comprises generation of a signal representing the pulse and emission of the same by means of an antenna.

In a development, the predefined condition comprises an advertisement pulse generated by the adjacent active NFC device is detected by the first active NFC device, or a collision between the advertisement pulse generated by the first active NFC device and an advertisement pulse generated by the adjacent active NFC device is detected by the first active NFC device.

According to the first possibility, after generating an advertisement, the first active NFC device checks in the field detection mode whether an advertisement pulse which has been generated by the adjacent active NFC device is detected. Upon detection of such an external advertisement pulse, the first active NFC device assumes its active mode.

According to the second possibility, the first active NFC device checks by monitoring electrical characteristics during generation of an advertisement pulse whether an advertisement pulse has been generated concurrently by the adjacent active NFC device. Concurrent generation of an advertisement pulse by the first active NFC device and by the adjacent active NFC device is referred to as a collision. Detection of such a collision entails the first active NFC device to assume its active mode.

During generation of an advertisement pulse, the first active NFC device is inhibited to detect an advertisement pulse concurrently generated by the adjacent active NFC device. The proposed method enables by the first possibility avoidance of a collision or by the second possibility detection of a collision and subsequent reliable detection of the adjacent device.

Either the first or the second possibility may be used in implementing the proposed method. For further improvement of the reliability of the detection or for further extension of the detection area, both possibilities may be combined.

In a further development the generation of another advertisement pulse is effected after an amount of time which is randomly varied within predefined boundaries.

In order to avoid repeated concurrent generation of advertisement pulses by two active NFC devices, i.e., the first and the adjacent active NFC device, the device which executes the proposed method varies the length of the period of time between the generation of an advertisement pulse and the generation of another advertisement pulse. A random generator may be used to implement this variation in time. A minimum and a maximum time duration between two advertisement pulses, i.e. the repetition period, is chosen, based on experience, in the range between, for example, 0.1 s and 2 s. Shorter repetition time results in higher current consumption, whereas longer repetition time slows down the detection mechanism. Said minimum and maximum represent the predefined boundaries.

In another development, the generation of an advertisement pulse comprises concurrently measuring at least one electrical characteristic of a signal at an antenna of the first active NFC device.

The electrical characteristic may comprise an amplitude and/or a phase of the signal at the antenna of the first active NFC device.

When using the predefined condition that a collision between advertisement pulses concurrently generated in the first active NFC device and the adjacent active NFC device is detected in the proposed method, it is necessary to measure an electrical characteristic of the signal at the antenna of the first active NFC device during the generation of the advertisement pulse. If a collision happens, the amplitude and/or the phase of the generated advertisement pulse is impacted. In other words, a change in amplitude and/or phase of the signal at the antenna of the first active NFC device with respect to an amplitude and/or phase of the signal at the antenna of the first active NFC device of a previously generated advertisement pulse is an indication for a collision. Therein, an amplitude change can be negative or positive depending on the relative phase of the two colliding signals, i.e. the two colliding advertisement pulses. For a specific phase difference of these signals the amplitude difference may be zero and the phase difference may be at a maximum. Therefore, measuring or monitoring both electrical characteristics, for example amplitude and phase enhances the robustness of the method.

In a further development, assuming the active mode is effected immediately or after a time span which is randomly generated.

The active mode corresponds to the active mode described in NFC forum standards as known by those skilled in the art. Assuming the active mode blocks the first active NFC device from generating further advertisement pulses. In the active mode generally more processing power becomes available to the first active NFC device than in the field detection mode. The first active NFC device starts communicating with the detected adjacent NFC device by initiating legacy NFC transmissions. A protocol that is commonly used in this is the ISO 18092 protocol, which is also called NFC IP1. In this protocol, one device takes the role of a so-called peer-to-peer initiator and the other device takes the role of a target.

In the case where the method employs the first possible predefined condition, i.e. detection of an advertisement pulse generated by the adjacent active NFC device, the first active NFC device immediately goes out of the field detection mode and assumes the active mode. In the case that the method employs the second possibility for the predefined condition, i.e. the detection of a collision between concurrent advertisement pulses, the first active NFC device assumes the active mode after the randomly generated time span. Said time span ranges between zero and a few tens of milliseconds, for example. While waiting to assume the active mode, the first active NFC device stays in the field detection mode monitoring the external magnetic field.

This timing avoids that both devices start the communication at the same time. Because the detection of an external magnetic field is fast, for instance within 20 microseconds, said time span does not need to be very long. It should be short enough in order to prevent delaying the initiation of the communication and possible remove the device by the user.

In a further development, in the active mode a notification pulse is generated.

To make sure that the detected adjacent active NFC device is also aware of the presence of the first active NFC device, the first active NFC device may generate the notification pulse.

In another development, in the field detection mode scanning for an incoming advertisement pulse is enabled.

As described above, in the field detection mode the first active NFC device monitors the electromagnetic field at its antenna for incoming advertisement pulses.

In a further development, the advertisement pulse generated by the first active NFC device and/or the advertisement pulse generated by the adjacent active NFC device each comprise a pulse with a defined duration at a defined carrier frequency.

The carrier frequency as already described amounts to 13.56 MHz. The advertisement pulse is sent at this frequency at regular intervals. The duration of an advertisement pulse can be 20 microseconds, for example. The repetition period can vary between 100 milliseconds and 2 seconds, for example.

In one embodiment, a circuit arrangement for an active NFC device comprises a receiver component, an antenna driver component, a frequency generating component, and a control logic unit. The receiver component is prepared to be connected to an antenna in order to detect an incoming advertisement pulse in a field detection mode. The antenna driver component is prepared to be connected to the antenna in order to generate an advertisement pulse. The frequency generating component is prepared to generate a carrier frequency. The control logic unit is coupled to the receiver component, the antenna driver component and to the frequency-generating component. The control logic unit is prepared to implement the method described above in cooperation with the receiver component, the antenna driver component and the frequency-generating component.

The circuit arrangement enables reliable detection of an adjacent active NFC device. It may be implemented in an interface chip which in turn can be embedded into a mobile phone or an accessory device, for example.

In a development, the circuit arrangement further comprises a regulator component which is prepared to generate a supply voltage for the circuit arrangement from an energy supply external to the circuit arrangement.

As the circuit arrangement is commonly implemented in a device, the energy supply of this device which is external to the circuit arrangement is reused. For this, the regulator component adapts voltage levels to provide a supply voltage for the circuit arrangement.

The control logic unit may implement the described method in a finite state machine, for example.

BRIEF DESCRIPTION OF THE DRAWINGS

The text below explains the proposed method and corresponding circuit arrangement in detail using exemplary embodiments with reference to the drawings. Components and circuit elements that are functionally identical or have the identical effect bear identical reference numbers. In so far as circuit parts or components correspond to one another in function, a description of them will not be repeated in each of the following figures.

FIG. 4 shows a timing diagram corresponding to the embodiment of FIG. 3;

FIG. 5 shows a timing diagram for the embodiments of FIGS. 1 and 3;

FIG. 6 shows another timing diagram for the embodiments of FIGS. 1 and 3;

The following reference symbols can be used in conjunction with the drawings:

S1, S2, S3, S4, S0, S34 step
REC receiver component
DRV antenna driver
FRQ frequency generating component
CTL control unit
REG regulator component
P1a, P1b, P2a, P2b advertisement pulse
Pn notification pulse
T_rand1, T_rand2 amount of time
T_rand3, T_rand4 time span
D1, D2 device
H1, H2 host processor
A1, A2 antenna
EMF electromagnetic field
C1, C2 circuit arrangement
PS protocol stack
t time
t1, t2, t3, t4, t5 point in time
D, T1, T2 duration
RFI1, RFI2, RFO1, RFO2 connection point
OSC_IN, VDD, VSP connection point
Δ1, Δ2 difference

DETAILED DESCRIPTION OF ILLUSTRATIVE EMBODIMENTS

Figure 1:
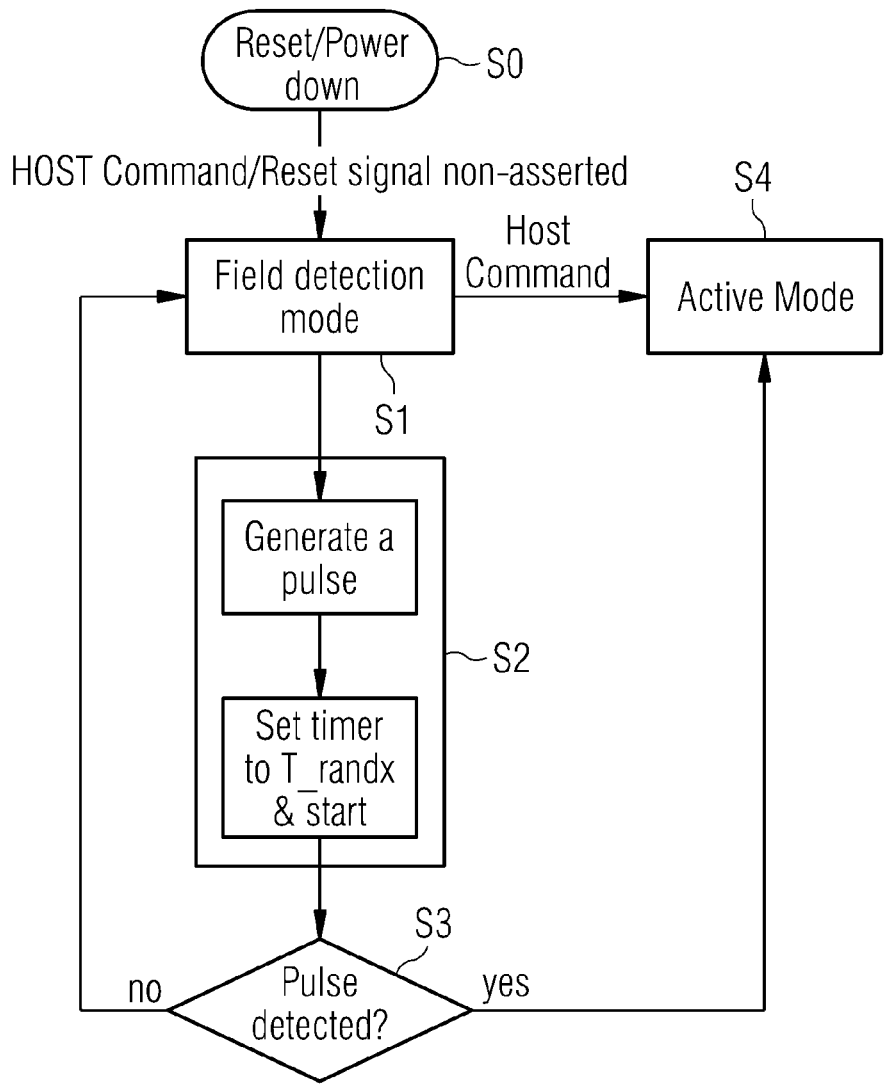
FIG. 1 shows a first embodiment example of the proposed method.

FIG. 1 shows a first embodiment example of the proposed method in the form of a flow chart.

The method is executed by a first active NFC device. Said device may implement the method in the form of a finite state machine. Before the method starts, the device is in a reset or power down mode in step S0. By means of a command from a superior host processor, for example, the method is started and the device is put out of the reset mode and assumes a field detection mode in step S1.

In the next step S2 an advertisement pulse is generated by the first active NFC device. Concurrently a timer is set to an amount of time T_randx which is randomly generated, taking into account boundaries defined as described above. The timer is started.

Subsequently, in step S3 the first active NFC device which is still in field detection mode checks whether an advertisement pulse generated by an adjacent active NFC device has occurred. If this checking proves positive, i.e. an advertisement pulse from the adjacent active NFC device is detected, the first active NFC device leaves the field detection mode and assumes an active mode in step S4.

On the other hand, if the checking proves negative, i.e. the scanning in the field detection mode did not detect any advertisement pulse emitted by an adjacent active NFC device, the first active NFC device stays in the field detection mode and repeats the steps S1, S2 and S3 in a loop until an external advertisement pulse is detected. Therein, a new advertisement pulse is generated in step S2 whenever the timer which was set and started in the previous round of the loop has elapsed, i.e. when the amount of time T_randx has passed.

As the timer between the generation and emission of two advertisement pulses is varied, collision of advertisement pulses generated by a first and an adjacent active NFC device is avoided. The reliability of detection is thereby enhanced.

The first embodiment of the method as shown in FIG. 1 implements the first possibility of the predefined condition as described above.

As depicted in FIG. 1, it is also possible that the first active NFC device can be forced to assume the active mode by means of a suitable command from a host processor within the first active NFC device.

Figure 2:
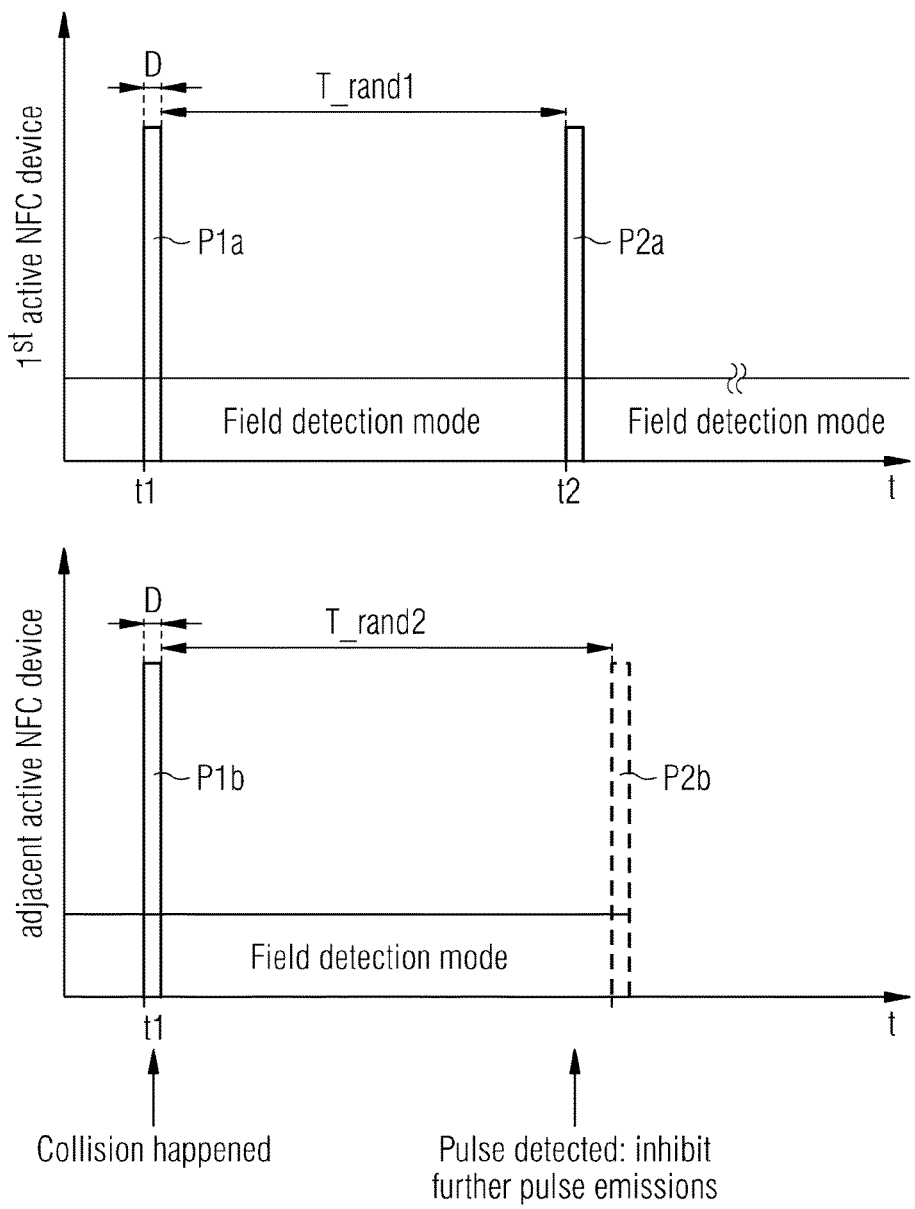
FIG. 2 shows a timing diagram corresponding to the embodiment of FIG. 1.

FIG. 2 shows a timing diagram corresponding to the embodiment of FIG. 1. The upper part of FIG. 2 shows the timing of the first active NFC device, whereas the lower part of FIG. 2 shows the timing of the adjacent active NFC device each in relation to time t. Both devices implement the method as described under FIG. 1.

At a first point in time t1 the first active NFC device generates an advertisement pulse P1a. Concurrently, the adjacent active NFC device generates an advertisement pulse P1b. Each advertisement pulse P1a, P1b has a duration D. As both active NFC devices emit an advertisement pulse P1a, P1b at exactly the same point in time t1, detection of each other is impossible. External advertisement pulses can only be detected in the field detection mode which is quitted for a short time for emitting an advertisement pulse.

As described above with reference to step S2, after generating and emitting the advertisement pulses P1a, P1b, the first and the adjacent active NFC device each set a timer to a different amount of time T_randx and starts the timer. The device sets its timer to T_rand1 and the adjacent active NFC device sets its timer the amount of time T_rand2. As both amounts of time T_rand1, T_rand2 are generated by means of a pseudorandom generator, a repetition period between the generation of two advertisement pulses in each device has a different length. In the case depicted in FIG. 2 by way of example, the amount of time T_rand1 between two advertisement pulses P1a, P2a in the first active NFC device is shorter than the amount of time T_rand2 between two advertisement pulses P1b, P2b in the adjacent active NFC device. Consequently, at a point in time t2 the first active NFC device generates and emits another advertisement pulse P2a. Said advertisement pulse P2a is detected by the adjacent active NFC device which at this point in time is still in the field detection mode. Emission of another advertisement pulse P2b by the adjacent active NFC device is consequently inhibited which is why the potential advertisement pulse P2b is marked with dashed lines. The adjacent active NFC device consequently assumes the active mode.

For the generation of the variable amount of time T_randx in each of the active NFC devices different possibilities can be chosen. For example, the amount of time T_randx can be divided into portions, namely a fixed portion that may range from, for example, 100 milliseconds to 2 seconds, which is followed by a variable portion the length of which is set by the pseudorandom generator from an interval of 0 to 10 milliseconds.

Figure 3:
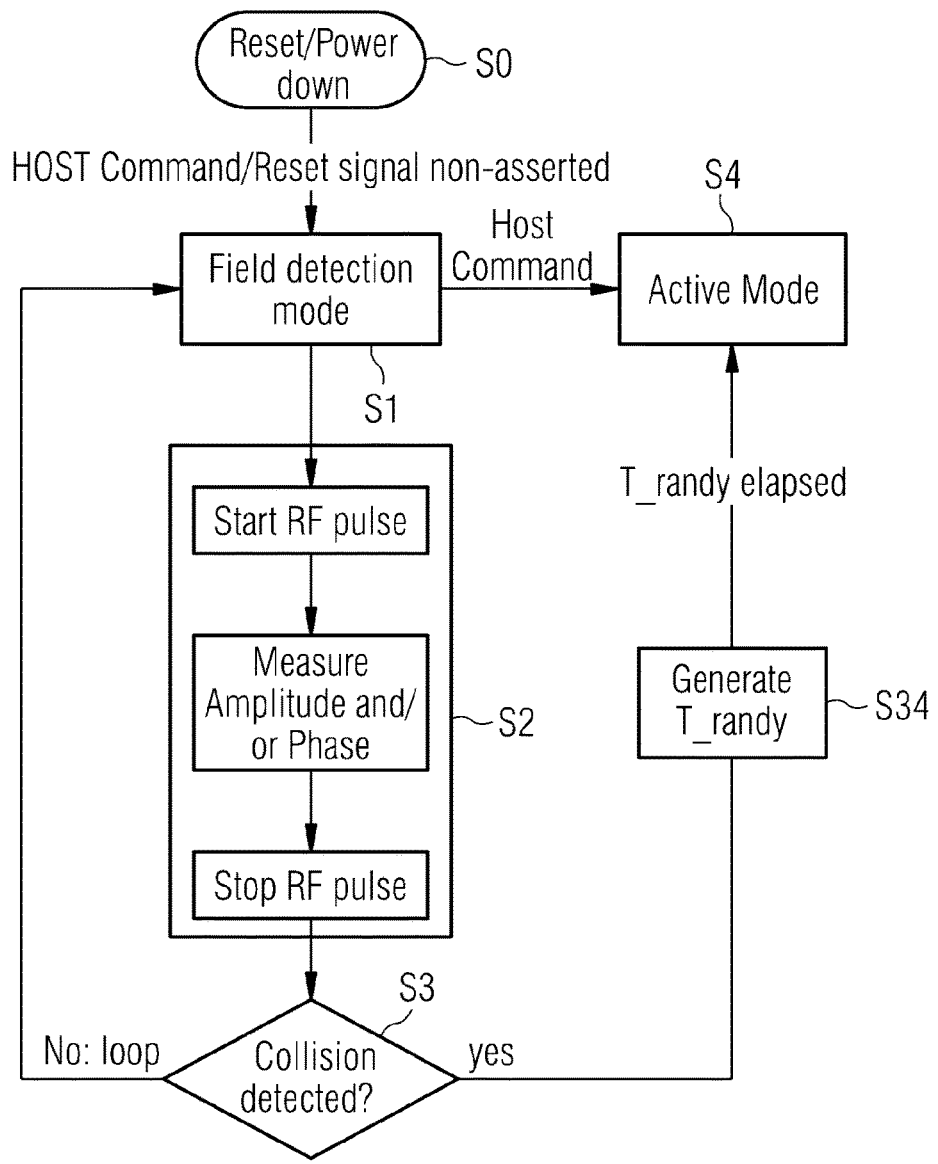
FIG. 3 shows a second embodiment example of the proposed method.

FIG. 3 shows a second embodiment example of the proposed method. The method depicted in FIG. 3 corresponds to the method depicted in FIG. 1 except for the differences described in the following.

In step S2 the first active NFC device generates an advertisement pulse and concurrently measures an electrical characteristic of a signal at its antenna, for example an amplitude and/or a phase of said signal.

In step S3 the first active NFC device checks whether the amplitude and/or the phase of the signal at its antenna has changed in comparison to the amplitude and/or the phase of the previously generated advertisement pulse. If this is the case, a collision between the advertisement pulse generated by the first active NFC device and an advertisement pulse generated by an adjacent active NFC device has occurred. In case of such a collision, the first active NFC device assumes the active mode in step S4 after a time span T_randy which is randomly generated in step S34. Consequently, as soon as the generated time span T_randy has elapsed, the first active NFC device is in the active mode S4 and starts communicating with the adjacent active NFC device. Consequently, the active mode is assumed in step S4 either immediately after a collision has been detected in step S3 which is the case when the timer T_randy is set to zero seconds, or the active mode is assumed after a random time span T_randy. The active mode is also assumed if an advertisement pulse of the adjacent active NCF device is detected even without collision.

In the case that neither a collision nor an advertisement pulse has been detected in step S3, the active NFC device stays in the field detection mode starting again with step S1.

The embodiment depicted in FIG. 3 consequently realizes the second predefined condition described above.

It is also possible to combine the embodiments depicted in FIG. 1 and FIG. 3 to achieve an even more robust detection of active NFC devices.

FIG. 4 shows a timing diagram corresponding to the embodiment of FIG. 3. Similar to FIG. 2, the upper part of FIG. 4 shows the timing of the first active NFC device and in the lower part the timing of the adjacent active NFC device is presented. Both devices employ the method as described with reference to FIG. 3.

At a first point in time t1 the first active NFC device generates an advertisement pulse P1a with the duration D. At a second point in time t2 the adjacent active NFC device generates an advertisement pulse P1b with the duration D. Because both devices are not in the detection range of each other at the second point in time t2 and at the first point in time t1, the advertisement pulses P1a and P1b are not detected.

The first active NFC device generates the next advertisement pulse P2a after a first duration T1 at the third point in time t3. Concurrently, at the third point in time t3 the adjacent active NFC device generates another advertisement pulse P2b after a second duration T2. The first active NFC device and the adjacent active NFC device measure the electrical characteristics at their respective antenna. The first active NFC device consequently detects a difference in amplitude Δ1 to the amplitude of the previous advertisement pulse P1a. The adjacent active NFC device detects a second difference in amplitude Δ2 between the advertisement pulses P2b and P1b. Therefore, both devices detect that a collision happened. Both devices are aware that an active NFC device is in range.

Subsequently, the first active NFC device assumes the active mode after a randomly generated time span T_rand3. The adjacent active NFC device assumes the active mode after the randomly generated time span T_rand4. During the time span T_rand3, T_rand4 each active device monitors if an external electromagnetic field is detected in the field detection mode. The device that chooses the shortest time span T_rand3, T_rand4, here the first active NFC device, is the one that starts activation, i.e. enters the active mode. As soon as an activation sequence is detected by the peer device, here the adjacent active NFC device, which has chosen the longer time span T_rand4, the adjacent active NFC device is prevented from generating its own activation sequence.

FIG. 5 shows a timing diagram for the embodiments of FIGS. 1 and 3. From the top to the bottom the timing within the first active NFC device, the timing within the adjacent active NFC device and the approach between the two devices are depicted.

The first active NFC device generates an advertisement pulse P1a at the first point in time t1. The first active NFC device is in its field detection mode during which it is scanning for external advertisement pulses and also generating its own advertisement pulses P1a, P2a. The adjacent active NFC device also is in its field detection mode scanning for external advertisement pulses and optionally generating own advertisement pulses, like pulse P1b at the second point in time t2.

The distance between the two devices is decreased until a point where advertisement pulses can be detected. In the depicted example this is the case at a distance of 10 cm. At the third point in time t3 the first active NFC device generates an advertisement pulse P2a which is detected by the adjacent active NFC device. Upon detection, the adjacent active NFC device immediately assumes its active mode. At a fourth point in time t4, the adjacent active NFC device sends a notification pulse Pn which is detected by the first active NFC device which is still in its field detection mode. Thereupon, the first active NFC device also assumes its active mode. Now both devices are ready to start a legacy NFC transmission by using, for example the ISO 18092 protocol. According to this protocol, as depicted in FIG. 5, the first active NFC device takes up the role of a peer-to-peer initiator, whereas the adjacent active NFC device assumes the role of a peer-to-peer target.

FIG. 6 shows another timing diagram for the embodiments of FIGS. 1 and 3. The diagrams of FIG. 6 correspond to the diagrams of FIG. 5 except for the differences described in the following.

As soon as the adjacent active NFC device detects the advertisement pulse P2a generated by the first active NFC device at the third point in time t3, it becomes active assuming its active mode. The adjacent active NFC device immediately starts an exchange with the first active NFC device thereby acting as a peer-to-peer initiator. The first active NFC device detects this initiation of communication at a fifth point in time t5 and subsequently assumes the active mode and becomes a peer-to-peer target.

Figure 7:
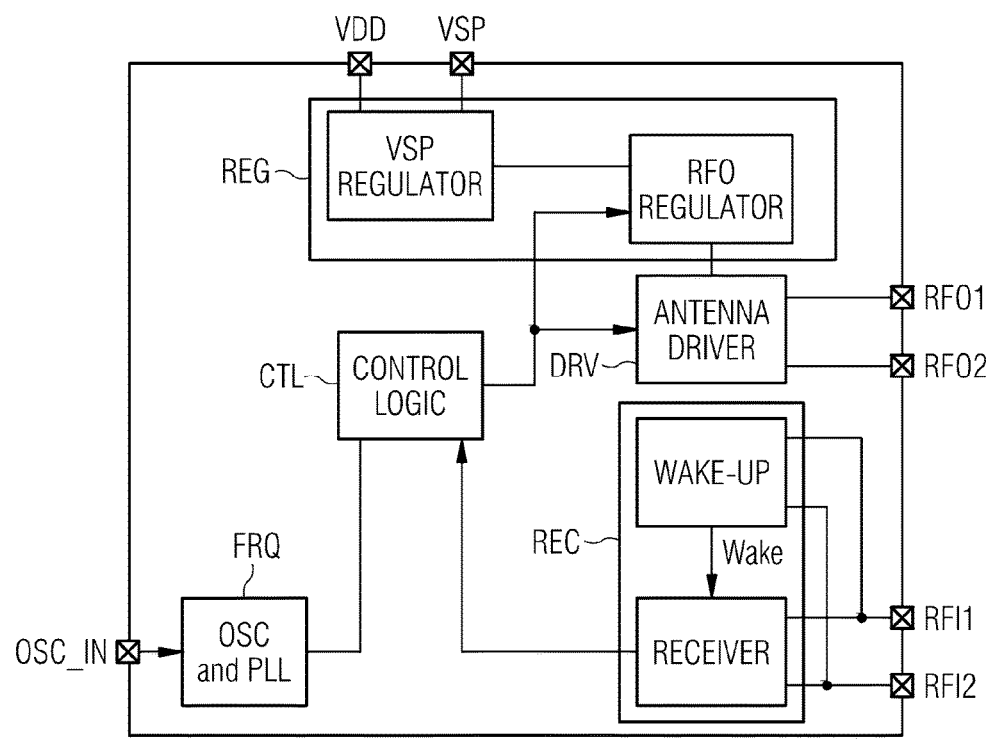
FIG. 7 shows an embodiment example of the proposed circuit arrangement.

FIG. 7 shows an embodiment example of the proposed circuit arrangement. The depicted circuit arrangement for an active NFC device comprises a receiver component REC, an antenna driver component DRV, a frequency generating component FRQ and a control logic unit CTL. The receiver component REC is prepared to be connected to an antenna by means of connection points RFI1, RFI2, in order to detect an incoming advertisement pulse in the field detection mode. The antenna driver component DRV is prepared to be connected to the antenna by means of connection points RFO1, RFO2, in order to generate an advertisement pulse which is emitted using the connectable antenna. The frequency generating component FRQ is prepared to generate a carrier frequency, for example 13.56 MHz. The control logic unit CTL is coupled to the receiver component REC, the antenna driver component DRV and to the frequency generating component FRQ. The control logic unit CTL is prepared to implement the proposed method for detecting an adjacent active NFC device in cooperation with the receiver component REC, the antenna driver component DRV and the frequency generating component FRQ.

The receiver component REC may be implemented in the form of a wakeup receiver. The receiver component REC is active during the field detection mode during which it allows incoming advertisement pulses to be detected. The frequency generating component FRQ generates the carrier frequency from a reference frequency supplied by connection point OSC_IN using an oscillator and a phase locked loop, for instance. When using a phase locked loop, the reference frequency may be different from the needed carrier frequency. The antenna to be connected to the connection points RFO1, RFO2, RFI1, RFI2 may be as small as 50 mm$^2$. A matching circuit can be interposed between the antenna and the antenna driver component DRV and the receiver component REC as is well-known by those skilled in the art.

The circuit arrangement also comprises a regulator component REG which is prepared to generate a supply voltage from an energy supply which is external to the circuit arrangement. The external energy is supplied for instance by means of connection points VSP and VDD.

Figure 8:
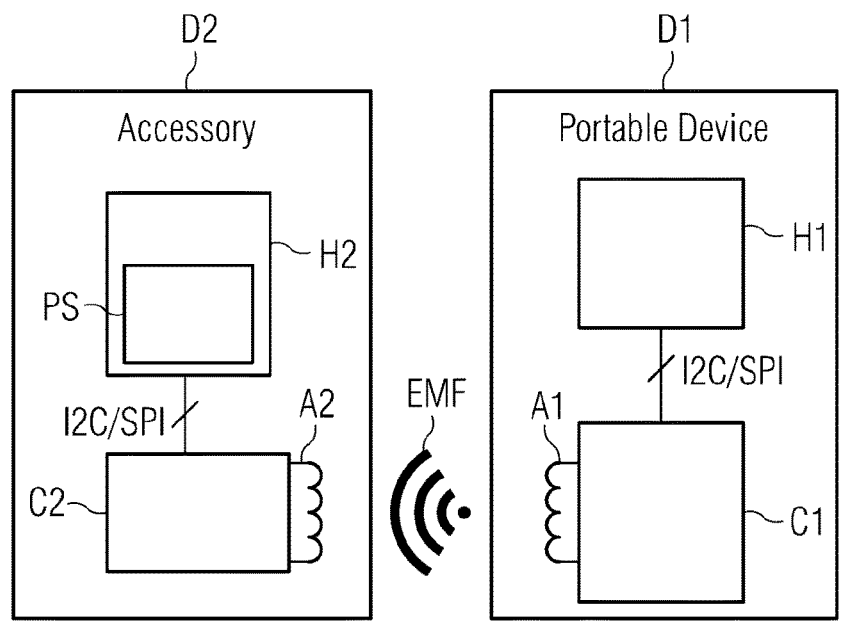
FIG. 8 shows a first usage scenario of the proposed method and circuit arrangement.

FIG. 8 shows a first usage scenario for the proposed method and circuit arrangement. A first active NFC device D1 and an adjacent active NFC device D2 are depicted. In between the first and the adjacent active NFC device D1, D2 an electromagnetic field EMF is shown. In this scenario the first active NFC device D1 is a mobile, portable or fixed device. The adjacent active NFC device D2 is an accessory which can also be portable, mobile or fixed. Such a pair of devices D1, D2 can be a mobile phone as first active NFC device D1 and a wireless speaker as adjacent active NFC device D2. It can also be a laptop and a smart stylet, a mobile phone and a printer, a laptop and a smart wearable device, and so on. The first active NFC device D1 has a host processor H1 and a circuit arrangement C1 as described above. The circuit arrangement C1 is connected to an antenna A1. The adjacent active NFC device D2 similarly has a host processor H2 with a legacy protocol stack for NFC communications and a circuit arrangement C2 as proposed above. Furthermore, an antenna A2 is provided.

Figure 9:
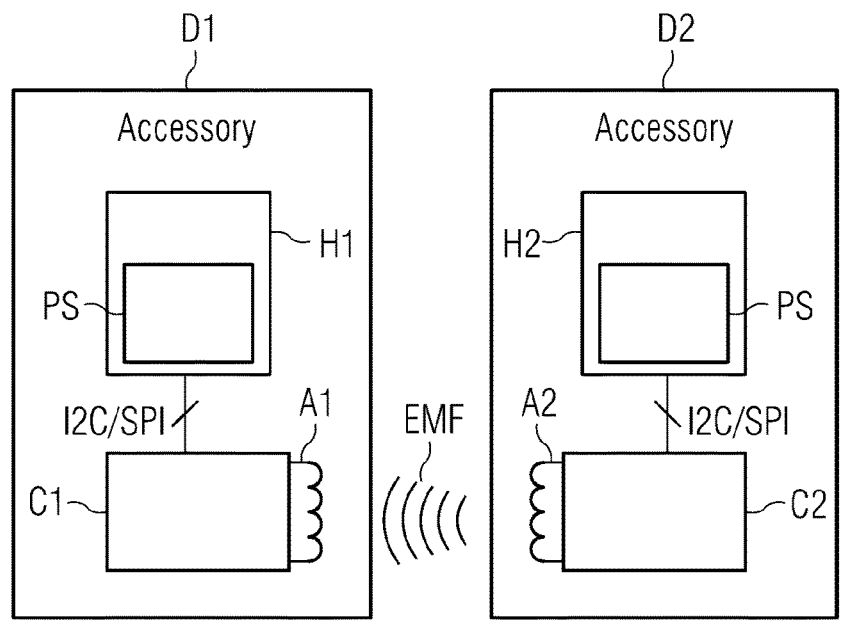
FIG. 9 shows a second usage scenario of the proposed method and circuit arrangement.

FIG. 9 shows a second usage scenario for the proposed method and circuit arrangement. In this scenario the first and the adjacent active NFC device D1, D2 are both realized as accessory devices which can communicate with each other.

It is to be understood that any feature described in relation to any one embodiment may be used alone, or in combination with other features described, and may also be used in combination with one or more features of any other of the embodiments, or any combination of any other of the embodiments unless described as alternative. Furthermore, equivalents and modifications not described above may also be employed without departing from the scope of the carrier signal generation circuit and method which are defined in the accompanying claims.

What is claimed is:

1. A method using near-field communication (NFC), the method comprising:
   assuming, by a first active NFC device configured to generate a radio frequency field, a field detection mode, the field detection mode being a low power mode of the first active NFC device;
   generating, by the first active NFC device while the first active NFC device is in the field detection mode, an advertisement pulse;
   checking, by the first active NFC device while the first active NFC device is in the field detection mode, whether a predefined condition is fulfilled;
   if the checking determines that the predefined condition is fulfilled, assuming, by the first active NFC device, an active mode and communicating with an adjacent active NFC device while the first active NFC device is in the active mode, the active mode being different from the field detection mode, the active mode being a mode in which the first active NFC device requires more processing power than in the field detection mode; and
   if the checking does not determine that the predefined condition is fulfilled, staying in the field detection mode and generating, by the first active NFC device, another advertisement pulse.

2. The method according to claim 1, wherein the predefined condition comprises an advertisement pulse generated by the adjacent active NFC device being detected by the first active NFC device.

3. The method according to claim 2, wherein the advertisement pulse generated by the adjacent active NFC device comprises a pulse with a defined duration at a defined carrier frequency.

4. The method according to claim 1, wherein the predefined condition comprises a collision between the advertisement pulse generated by the first active NFC device and an advertisement pulse generated by the adjacent active NFC device being detected by the first active NFC device.

5. The method according to claim 4, wherein the advertisement pulse generated by the first active NFC device or the advertisement pulse generated by the adjacent active NFC device comprises a pulse with a defined duration at a defined carrier frequency.

6. The method according to claim 4, wherein the advertisement pulse generated by the first active NFC device comprises a pulse with a defined duration at a defined carrier frequency and the advertisement pulse generated by the adjacent active NFC device comprises a pulse with a defined duration at a defined carrier frequency.

7. The method according to claim 1, wherein generating the another advertisement pulse is effected after an amount of time that is randomly varied within predefined boundaries.

8. The method according to claim 1, wherein generating an advertisement pulse comprises concurrently measuring an electrical characteristic of a signal at an antenna of the first active NFC device.

9. The method according to claim 1, wherein assuming the active mode is effected after a time span that is randomly generated.

10. The method according to claim 1, wherein assuming the active mode is effected immediately after a time span that is randomly generated.

11. The method according to claim 1, wherein a notification pulse is generated in the active mode.

12. The method according to claim 1, wherein scanning for an incoming advertisement pulse is enabled in the field detection mode.

13. An active near-field communication (NFC) device configured to generate a radio frequency field, the active NFC device comprising:
- a receiver configured to be connected to an antenna in order to detect an incoming advertisement pulse while the active NFC device is in a field detection mode, the field detection mode being a low power mode of the active NFC device;
- an antenna driver configured to be connected to the antenna in order to generate an advertisement pulse;
- an oscillator configured to generate a signal at a carrier frequency; and
- a controller coupled to the receiver, the antenna driver and to the oscillator, the controller configured to
  - cause the active NFC device to assume the field detection mode;
  - generate an advertisement pulse while the active NFC device is in the field detection mode;
  - check whether or not a predefined condition is fulfilled while the active NFC device is in the field detection mode;
  - cause the active NFC device to assume an active mode and communicate with an adjacent active NFC device while the first active NFC device is in the active mode when the predefined condition is fulfilled, the active mode being different from the field detection mode, the active mode being a mode in which the active NFC device requires more processing power than in the field detection mode; and
  - generate another advertisement pulse when the predefined condition is not fulfilled and while the active NFC device stays in the field detection mode.

14. The active NFC device according to claim 13, further comprising a voltage regulator configured to generate a supply voltage for the device from an energy supply external to the device.

15. The active NFC device according to claim 14, wherein the predefined condition comprises detection of an advertisement pulse generated by the adjacent active NFC device.

16. The active NFC device according to claim 14, wherein the predefined condition comprises detection of a collision between the advertisement pulse generated by the active NFC device and an advertisement pulse generated by the adjacent active NFC device.

17. The active NFC device according to claim 14, wherein the controller is configured to generate the another advertisement pulse is after an amount of time that is randomly varied within predefined boundaries.

18. The active NFC device according to claim 14, wherein the controller is configured to generate the advertisement pulse by concurrently measuring an electrical characteristic of a signal at the antenna.

19. The active NFC device according to claim 14, wherein the controller is configured to cause the active NFC device to assume the active mode after a time span that is randomly generated.

20. An active near-field communication (NFC) device comprising:
- means for generating an advertisement pulse while in a field detection mode and concurrently measuring an electrical characteristic of a signal at an antenna of the active NFC device;
- means for checking whether or not a predefined condition is fulfilled;
- means for assuming an active mode and communicating with an adjacent active NFC device when the predefined condition is fulfilled; and
- means for generating another advertisement pulse when the predefined condition is not fulfilled and while the active NFC device stays in the field detection mode.

* * * * *